UNITED STATES PATENT OFFICE.

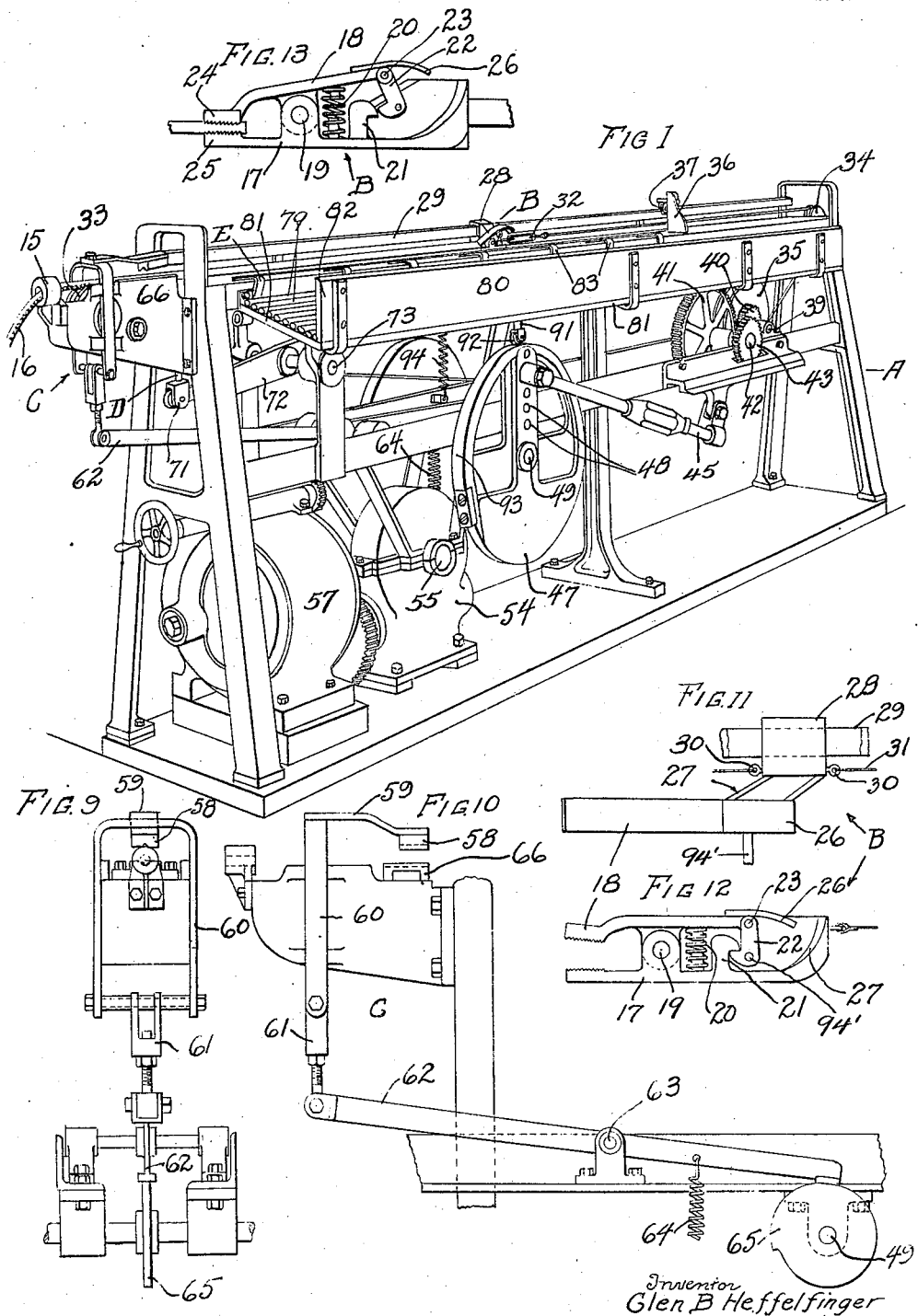

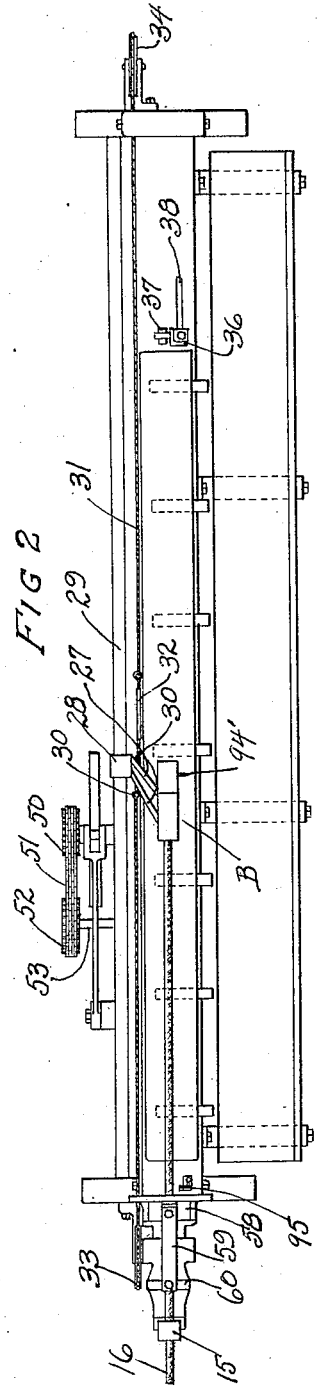

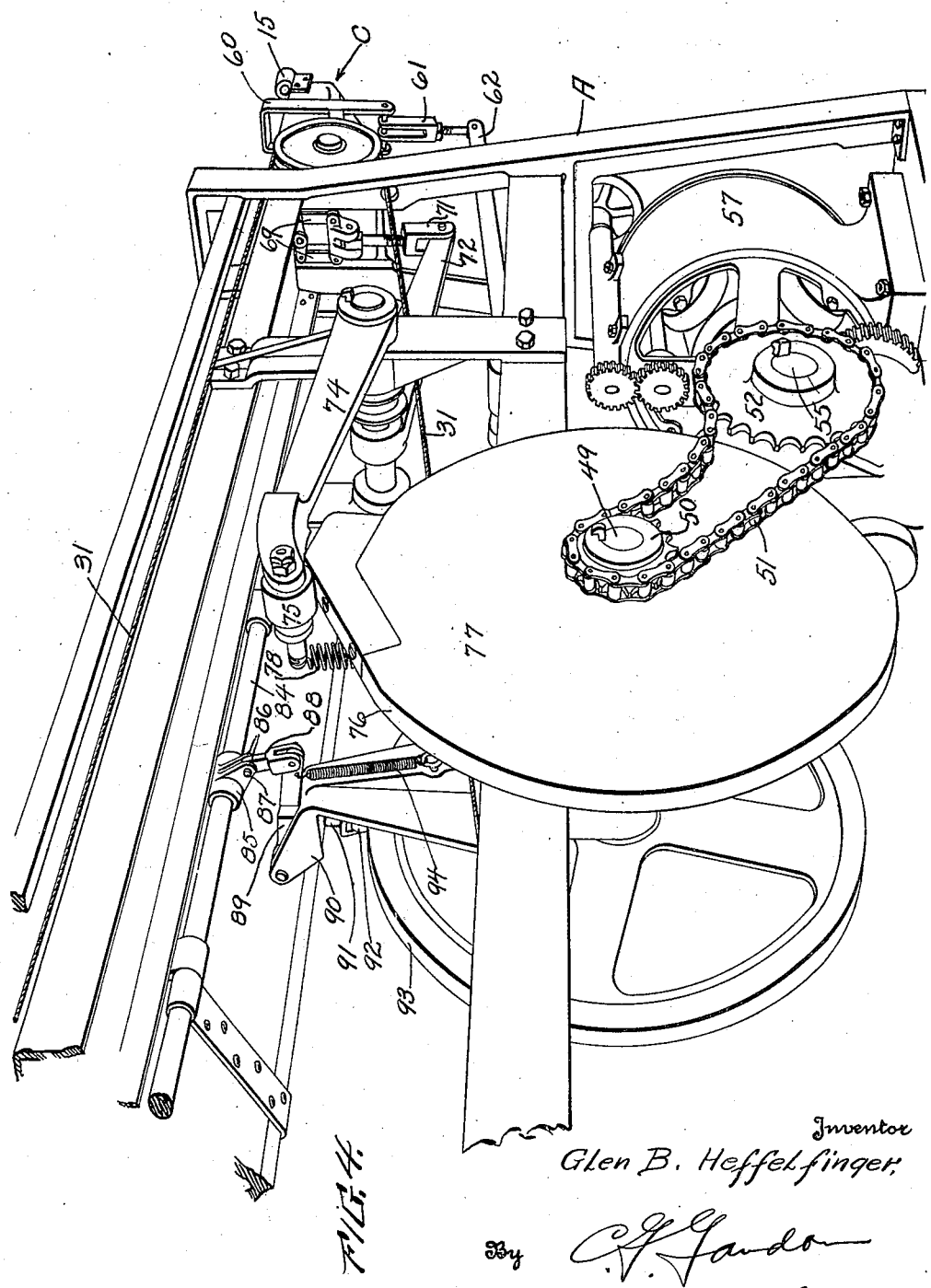

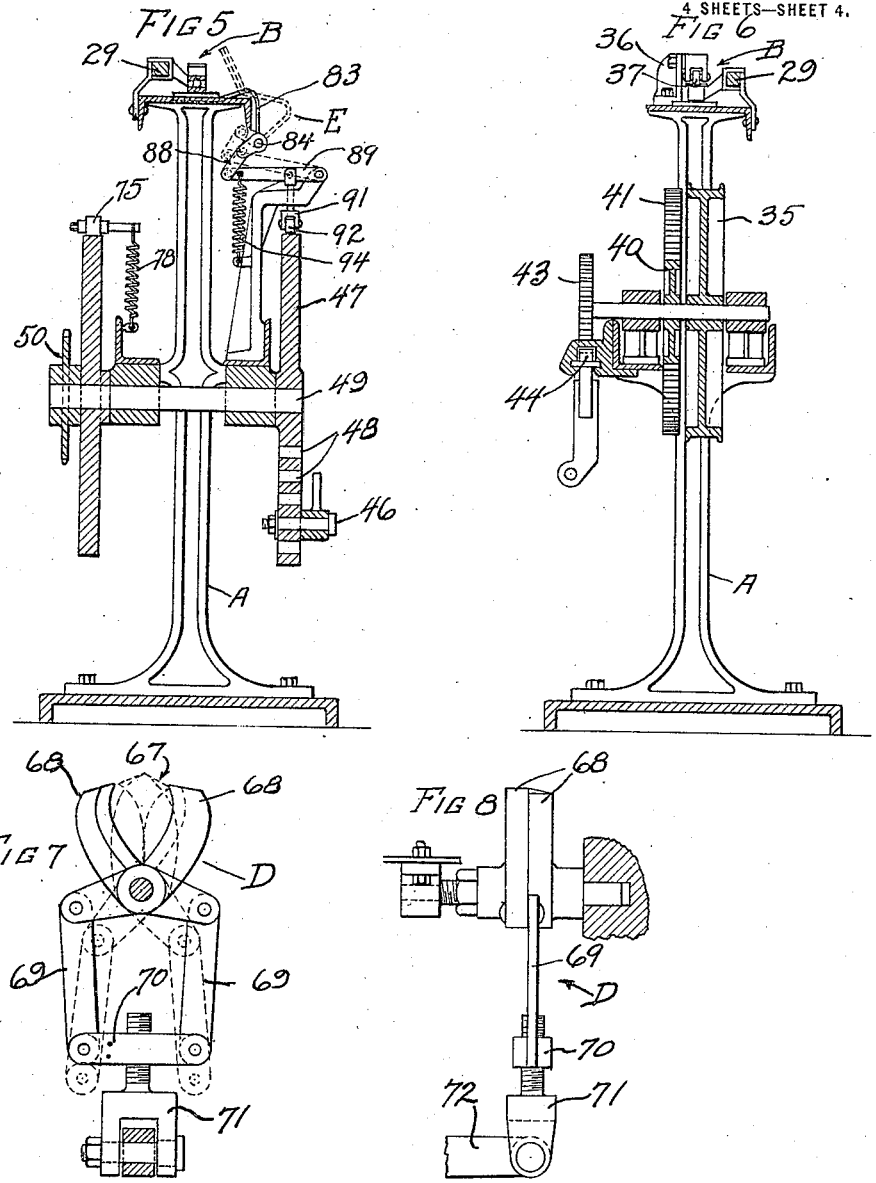

GLEN B. HEFFELFINGER, OF AKRON, OHIO, ASSIGNOR TO THE GOODYEAR TIRE & RUBBER COMPANY, OF AKRON, OHIO, A CORPORATION OF OHIO.

MEASURING AND CUTTING APPARATUS.

1,392,871.          Specification of Letters Patent.          Patented Oct. 4, 1921.

Application filed March 12, 1919. Serial No. 282,136.

*To all whom it may concern:*

Be it known that I, GLEN B. HEFFELFINGER, a citizen of the United States, and resident of Akron, Ohio, have invented new and useful Improvements in Measuring and Cutting Apparatus, of which the following is a specification.

My present invention relates to an apparatus used in the manufacture of beads for pneumatic tire casings, and has more particular reference to a device for automatically cutting to predetermined linear sections continuous lengths of the material used in the manufacture of such beads.

The particular objects and advantages of my invention will be apparent upon inspection of the accompanying drawings and perusal of the following specification and the appended claims, the invention residing in the novel combination, aggroupment and construction of parts, all as hereinafter fully described and claimed.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention, and throughout the several views of which similar reference characters designate corresponding parts:

Figure 1 is a perspective view of the apparatus;

Fig. 2 is a top plan view;

Fig. 3 is a front elevational view partly in section;

Fig. 4 is an enlarged perspective view of a portion of the apparatus;

Fig. 5 is a cross-sectional view, taken on the line 5—5 of Fig. 3;

Fig. 6 is a cross-sectional view, taken on the line 6—6 of Fig. 3;

Fig. 7 is a detailed sectional view showing the cutting device;

Fig. 8 is another detailed sectional view of the same;

Fig. 9 is an enlarged fragmentary view showing the bead clamping device in end elevation;

Fig. 10 is an enlarged broken view showing the bead clamping device in side elevation;

Fig. 11 is an enlarged fragmentary view showing the gripping device and its mounting;

Fig. 12 is an enlarged side elevational view of the gripping device; and

Fig. 13 is a similar view of the gripping device with parts in changed position.

The apparatus is more particularly designed to gage and cut sections from a strip of stock suitable for the formation of beads commonly provided on the casings of pneumatic tires, and it comprises a frame A; a device B for gripping the bead strip; a device C for clamping the bead strip; a device D for cutting the bead strip; a device E for removing the sections after they are cut off of the strip of bead material; and means for operating and for regulating the operations of the devices just mentioned.

At the head of the apparatus the frame A has suitably mounted thereon a guide ring 15 through which passes a strip 16 of the bead material which is intermittently gripped and drawn toward the rear end of the apparatus by means of the device B.

The gripping device B, preferably comprises a pair of jaw members 17 and 18 pivoted together as at 19. The jaw 17 is mounted by means of arms 27 and slide 28 for reciprocatory movement along a track or guide bar 29, this movement being accomplished by means of devices presently described. Normally the jaw 18 is rocked upon its pivot 19 by a spring 20 into the position shown in Fig. 13, whereby during the movement of the device along the track 29 in one direction, the bead strip 16 is gripped between the nipper portions 24 and 25. Upon the rear end of the jaw member 18 a latch 22 is pivoted as at 23, which latch is designed to engage with a latch stud 21 upon the jaw member 17 for a purpose presently set forth. A shoe or extension 26 is also provided upon the rear of the jaw 18 for engagement with a releasing device mounted upon the frame and hereinafter described. The slide 28 is provided with eyes 30, to which are connected the ends of a cable 31 which is provided with a turn buckle 32—to adjust its tension—and which after passing over suitably mounted sheaves 33 and 34 at the ends of the frame A is wound on the drum 35. The releasing device previously mentioned comprises a bracket 36 arranged on the frame A and provided with a roller 37 which, when the gripping device is moved toward the rear end of the apparatus, is adapted to contact with the shoe or extension piece 26 previously described to move the rear end of the jaw member 18 downwardly so that the latch 22 engages with the part 21 to hold apart the nippers 24 and 25. The bracket 36 is movable in a guide slot 38 in the frame A whereby the releasing device may be adjusted and locked in different position along the frame. The shaft 39 of the drum 35 is suitably journaled in the frame A and has mounted thereon the spur pinion 40 which meshes with the spur wheel 41 on the shaft 42. The latter is suitably mounted on the frame A and has mounted thereon the spur pinion 43 meshing with the teeth of the rack bar 44 which latter is slidably mounted on the frame A and is pivotally connected by the rod 45 to the wrist pin 46 of the crank 47. The crank 47 is provided with radial spaced openings 48 adapted to receive the wrist pin 46 so that the length of the stroke of the rack bar 44 can be adjusted to thereby regulate the amount of rotation of the drum 35 and thus control the extent of movement of the gripping device B. By regulating the extent of movement of the gripping device B the length of the sections cut off from the bead strip 16 can be gaged, as will be understood. The shaft 49 of the crank 47 has mounted thereon the sprocket pinion 50 which is connected by the sprocket chain 51 to the sprocket wheel 52 on the shaft 53. Suitable speed reducing gearing 54 connects the shaft 53 to the spur pinion 55 on the shaft 56 of the electric motor 57.

The device C for clamping the bead strip 16 when the latter is being cut, preferably comprises the grooved block 58 mounted on one end of the substantially horizontal arm 59 which has its other end attached to the inverted U bar 60. The bar 60 is mounted to slide vertically on the frame A and is pivotally connected to the link 61 which latter is in turn pivotally connected to the lever 62. The latter is pivoted as at 63 upon the frame A, and is held by a suitably arranged spring 64 in contact with the cam 65 mounted upon the shaft 49. The block 58 is adapted to co-act with the block 66 on the frame A, to hold there-between the end portion of the bead strip 16 until said end portion is gripped by the device B, as will be understood.

The device D for cutting the bead strip 16 preferably comprises the shears 67 between the cutting blades 68 of which the bead strip 16 passes, and which is arranged at the head end of the frame A adjacent to the clamping device C.

The cutting blades are mounted to swing about a common pivot and are connected at their lower ends by links 69 to a cross-bar 70. An adjusting member 71 connects the cross-bar 70 to the forward end of a rocker arm 72, having its shaft 73 journaled transversely in the frame A. The rear end 74 of the rocker arm is provided with a roller 75, which contacts with a peripheral surface 76 of a cam disk 77 carried upon the before-mentioned shaft 49 and clearly illustrated in Fig. 4 of the drawings. A coil spring 78 serves to retain the roller 75 in constant contact with the peripheral surface 76.

Along one side of the frame A is arranged a suitable receptacle 80 for the sections 79 which are cut off of the bead strip 16. The receptacle 80 preferably consists of the sloping table 81 which is suitably secured to the frame A and has suitably mounted thereon a board 82 which is adapted to retain the sections 79 on the table 81.

The device E for removing to the receptacle 80 the sections 79 cut off of the bead strip 16 preferably comprises the angular fingers 83 rigidly connected to a rocker shaft 84. A sleeve 85 provided with a bifurcated lug 86 is fast upon a rock shaft 84 extending longitudinally of the frame A. Pivoted at 87 to the lug 86 is a link 88 which connects the rock shaft 84 to one end of a lever 89 which at its opposite end is pivotally mounted to a standard 90 upon the frame A. To the lever 89 is pivotally connected one end of the bar 91 which passes slidably through the part 90 and carries at its lower end the roller 92 designed to contact with a cam surface 93 provided on the before mentioned crank 47. A spring 94 is connected between the lever 89 and the part 90 to keep the roller 92 in contact with the cam surface 93.

From the foregoing description, the construction, mode of operation and the advantages of the improved apparatus will be apparent to those skilled in the art. It will be understood that the operative connections between the devices B, C, D, and E are coordinated to effect the actuation of the devices at the proper time to accomplish their purposes. The gripping device B is reciprocated by the cable 31 connected to the drum 35 which is rotated first in one direction and then in the other through its adjustable operative connections with the crank 47. When the gripping device B reaches the head end of the apparatus, the latch 22 is moved out of engagement with the part 21 through engagement of the projection 94' on said latch with the projection 95 on the frame A, and then the nippers 24 and 25 are actuated by the spring 20 to take hold of the end portion of the bead strip 16. When the gripping device B nears the tripping roller 37 and its movement is retarded by reason of the connecting rod 45 being substantially at dead center, the clamping device C is actuated—through its operative connections with the cam 65—to hold the bead strip 16; and the shears 67 is actuated—through its operative connections with the cam disk 77—to cut off a section 79 from the bead strip 16. When the tail piece 26 of the gripping device B strikes the roller 37 the nipper 25 is moved away from the nipper 24 to release the section 79, whereupon the rocker shaft 84 through its operative connections with the cam surface 93 on the crank 47—is actuated to move the fingers 83 which remove the section 79 to the receptacle 80.

What I claim is:

1. In an apparatus of the character specified, the combination of a slidably mounted reciprocable gripping device, a rotatable drum, a cable connecting the gripping device to said drum, and means for successively rotating said drum in opposite directions, said means including a crank, and a connecting rod adjustably connected to said crank.

2. In an apparatus of the character specified, the combination of a slidably mounted gripping device mounted for reciprocatory movement, a drum, a cable having its central portion wound on said drum and having its end portions connected to said gripping device, a slidably mounted rack bar operatively connected with said drum, a crank provided with radial spaced openings, a wrist pin adapted to fit in any of said openings, and a rod connecting said rack bar to said wrist pin.

3. In an apparatus of the class specified, a slidably mounted jaw member, a spring-pressed jaw member pivotally mounted on the first mentioned jaw member and provided with a tail piece, a latch pivotally mounted on the second mentioned jaw member and adapted to engage with a part of the first mentioned jaw member, a roller arranged to co-act with said tail piece to effect disengagement of said latch from said part, a stationary projection, and a projection on said latch adapted to strike said stationary projection to effect engagement of said latch with said part.

4. An apparatus for cutting sections from a bead strip comprising in combination, spaced supports, a cutter mechanism adjacent one of the supports, gripper devices adapted to pull one end of the strip past the cutter mechanism and mounted to reciprocate with respect thereto, driving mechanism for reciprocating the gripper devices and causing a dwell at the end of each stroke thereof, clamping devices acting in conjunction with the gripper devices to hold a portion of the strip taut during the cutting operation, and means associated with said driving mechanism for actuating the clamping devices when the gripper devices are near the end of their far stroke relative to the cutting mechanism.

5. An apparatus for cutting sections from a bead strip comprising in combination, spaced supports, a cutter mechanism adjacent one of the supports, gripper devices adapted to pull one end of the strip past the cutter mechanism and mounted to reciprocate with respect thereto, driving mechanism for reciprocating the gripper devices and causing a dwell at the end of each stroke thereof, clamping devices acting in conjunction with the gripper devices to hold a portion of the strip taut during the cutting operation, means associated with said driving mechanism for actuating the clamping devices when the gripper devices are near the end of their far stroke relative to the cutting mechanism, and means for actuating the cutter mechanism after the clamping action has been effected.

6. In an apparatus of the class specified, the combination of a rock shaft, a plurality of angular fingers mounted on said rock shaft, a pivotally mounted arm, a link pivotally connected to said rock shaft and to said arm, a cam, a bar having one end thereof pivotally connected to said arm, and a roller on the end of said arm in contact with said cam.

7. An apparatus for cutting sections from a bead strip comprising in combination, spaced supports, a cutter mechanism adjacent one of the supports, gripper devices adapted to pull one end of the strip past the cutter mechanism and mounted to reciprocate with respect thereto, driving mechanism for reciprocating the gripper devices and causing a dwell at the end of each stroke thereof, clamping devices acting in conjunction with the gripper devices to hold a portion of the strip taut during the cutting operation, means associated with said driving mechanism for actuating the clamping devices when the gripper devices are near the end of their far stroke relative to the cutting mechanism, means for actuating the cutter mechanism after the clamping action has been effected, a plurality of ejector arms for receiving the cut sections, said arms being mounted to rock beneath the path of movement of the gripper devices, and cam means associated with the driving mechanism for rocking said arms after the cutting operation.

8. An apparatus for cutting sections from a bead strip comprising in combination, spaced supports, a cutter mechanism adjacent one of the supports, gripper devices adapted to pull one end of the strip past the cutter mechanism and mounted to reciprocate with respect thereto, driving mechanism for reciprocating the gripper devices and causing a dwell at the end of each stroke thereof, a guide adjacent the cutter mechanism for sustaining the free portion of the strip, a movably resilient member adapted to clamp the free portion of the strip against the guide, and means associated with the driving mechanism for effecting the clamping action when the gripper devices are near the end of their far stroke relative to the cutting mechanism.

9. An apparatus for cutting sections from a bead strip comprising in combination, spaced supports, a cutter mechanism adjacent one of the supports, gripper devices adapted to pull one end of the strip past the cutter mechanism and mounted to reciprocate with respect thereto, driving mechanism for reciprocating the gripper devices and causing a dwell at the end of each stroke thereof, a guide adjacent the cutter mechanism for sustaining the free portion of the strip, a movably resilient member adapted to clamp the free portion of the strip against the guide, means associated with the driving mechanism for effecting the clamping action when the gripper devices are near the end of their far stroke relative to the cutting mechanism, and means for actuating the cutter mechanism after such clamping action has been effected.

10. An apparatus for cutting sections from a bead strip comprising in combination, spaced supports, a cutter mechanism adjacent one of the supports, gripper devices adapted to pull one end of the strip past the cutter mechanism and mounted to reciprocate with respect thereto, driving mechanism for reciprocating the gripper devices and causing a dwell at the end of each stroke thereof, means adapted to actuate the gripper devices at the end of one stroke whereby said devices engage the end of the strip, clamping devices acting in conjunction with the gripper devices to hold a portion of the strip taut during the cutting operation, and means associated with said driving mechanism for actuating the clamping devices when the grippers are near the end of their far stroke relative to the cutting mechanism.

11. An apparatus for cutting sections from a bead strip comprising in combination, spaced supports, a cutter mechanism adjacent one of the supports, gripper devices adapted to pull one end of the strip past the cutter mechanism and mounted to reciprocate with respect thereto, driving mechanism for reciprocating the gripper devices and causing a dwell at the end of each stroke thereof, means adapted to actuate the gripper devices at the end of one stroke whereby said devices engage the end of the strip, clamping devices acting in conjunction with the gripper devices to hold a portion of the strip taut during the cutting operation, means associated with said driving mechanism for actuating the clamping devices when the grippers are near the end of their far stroke relative to the cutting mechanism, and means for actuating the cutter mechanism after the clamping action has been effected.

12. An apparatus for cutting sections from a bead strip comprising in combination, spaced supports, a cutter mechanism adjacent one of the supports, gripper devices adapted to pull one end of the strip past the cutter mechanism and mounted to reciprocate the gripper devices and causing a dwell at the end of each stroke thereof, means adapted to actuate the gripper devices at the end of one stroke whereby said devices engage the end of the strip, clamping devices acting in conjunction with the gripper devices to hold a portion of the strip taut during the cutting operation, means for actuating the clamping devices when the grippers are near the end of their far stroke relative to the cutting mechanism, means for actuating the cutter mechanism after the clamping action has been effected, and means adapted to actuate the gripper devices to release the strip after the cutting operation.

In witness whereof, I have hereunto signed my name in the presence of two subscribing witnesses.

GLEN B. HEFFELFINGER.

Witnesses:
L. M. HARTMAN,
E. C. LEADENHAM.